UNITED STATES PATENT OFFICE.

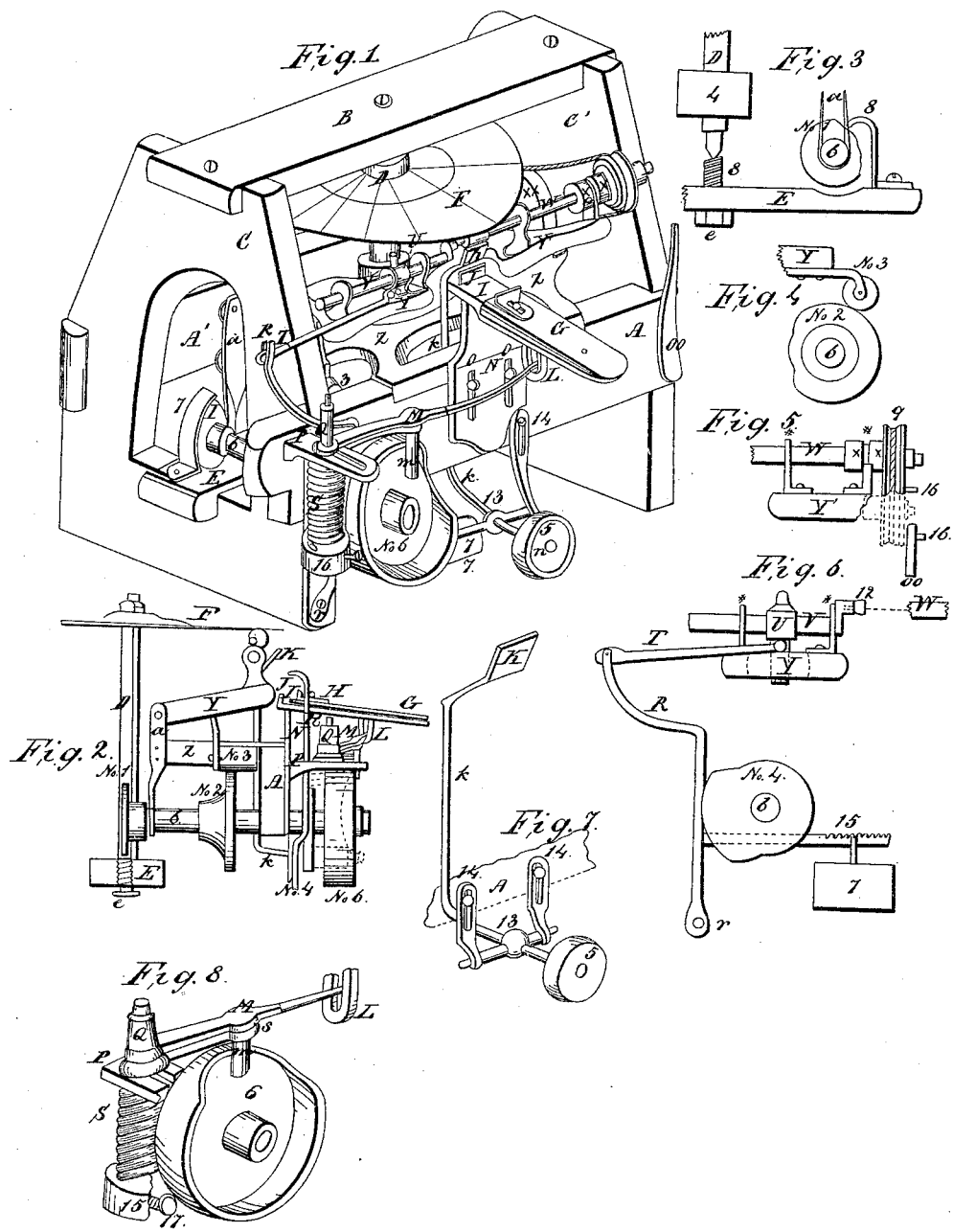

HARRIS BOARDMAN, OF LANCASTER, PENNSYLVANIA.

IMPROVEMENT IN CORK-MACHINES.

Specification forming part of Letters Patent No. 49,971, dated September 19, 1865.

*To all whom it may concern:*

Be it known that I, HARRIS BOARDMAN, of Lancaster, in the county of Lancaster and State of Pennsylvania, have invented new and useful Improvements on Cork-Cutting Machines; and I do hereby declare that the following is a full, clear, and exact description of the construction and operation of the same, reference being had to the accompanying drawings, making a part of this specification, in which—

Figure 1 is a perspective view of the machine with the several parts in place. Fig. 2 is a transverse view of the cam-shaft, cams, and their accessories; Fig. 3, the lifting-cam No. 1; E, the lower cross-piece, (in part,) showing the adjustable screw-step VIII for the cutter-shaft D, with its belt-pulley IV; Fig. 4, the cradle-cam No. 2, friction-pulley 3, connected with the bottom of the cradle Y. Fig. 5 shows the revolving spindle W and its bearings on the right-hand side of the cradle marked Y'. This spindle bears the pulley IX, check-pin 16, for arresting its motion when down by coming in contact with the stop o o. Fig. 6, the throwing-cam No. 4, for operating the sliding or non-revolving spindle V; Fig. 7, the tumbler; Fig. 8, the side cam No. 6, with its lever and spring connection to operate the adjustable chamber G.

The drawings, taken from a working model, are represented heavier and the chamber larger in proportion than a regular full-sized machine, which is properly made of cast-iron—the narrow top, B, for supporting the head of the shaft D, and the bottom piece, E, for the step.

The sides, C, may be ornamental. The front and rear may each have a bed-plate, A A', with the machinery partially duplicated, to cut on both sides with the same knife and gearing.

The adjustable chamber has a vertical side, N, with its projecting top I forming the base for the sliding plate G|or chamber proper, somewhat inclined downward. This chamber is substantially the same as secured by caveat June, 1864. The bed-plate A is also made adjustable on the sides of the machine, so that it can be inclined, together with the attached cradle Y, bearing the spindles V W, to present the cork held by the grasping ends of the spindles so inclined to the knife as to cut the desired taper. This adjustment presents no novelty, and is not shown in the drawings taken from the model, but represented in an inclined position.

To enable others skilled in the art to make and use my invention, I will now proceed to describe the action of each cam, separately considered, on the shaft VI, Fig. 2.

The lifting-cam No. 1, Fig. 3, has its bearing in *a*, from the rear of the entering portion of the bed-plate Z. (Shown in the drawings as of a separate piece from that of the vertical portion A, which is properly a single casting.) The hook VII shown is to represent a friction-roller supported by a connection with the step-support E. This lower cross-piece, E, is laid in a notch made on each side of the machine, or one end may be hinged. The object is that the knife or cutter will drop slightly after the cork has received the first cut to shape to receive the finishing cut. The shaft D, resting on its adjustable step VIII in the screw-thread of the cross-piece E, moves with it as the friction-roller or hook VII is raised or depressed by the undulating portion of the cam 1 in its revolutions. The cam being supported in its bearing in *a*, the piece E is necessarily lifted and drops into place by its gravity alone.

The cradle-cam No. 2, Fig. 4, is of a similar form and office. The friction-pulley 3 is connected with the lower side of the cradle Y, by which it is also supported, resting on the edge of the cam reversed from that of No. 1, as to the undulations. The cradle Y, being hinged in the prolonged support *a*, Fig. 2, is pressed upward in front, on which the several spindles have their bearings, and are consequently raised and lowered alternately with the motion of the cradle. The throwing-cam No. 4, Fig. 6, (placed directly behind cam No. 6,) operates a curved rod, R, held beneath in a pivot, *r*, provided with an arm, XV, graduated or toothed for a weight attachment, 7, to keep it up to its work in contact with the cam 4 by the desired amount of pressure. This rod R is connected with the head U of the spindle V by means of a rod, T, made adjustable at its connection. Its office is to draw the non-revolving spindle back to release the cut cork and to press it forward to grasp the cork laid in the chamber for being cut. The dropping of the cradle and inward motion of the spindle V are simultaneous. The side cam No. 6, Fig. 8, operates the adjustable chamber. The projecting flange has about one-third of its periphery gradually cut down to its base. Against this flange rests the descending portion m of the lever-arm M, powerfully acted upon by the spring S in its adjustable supports P XVI XVII. The lever is carried forward and connected with the sliding or chamber plate G by means of a cleat, L, passing to and fro in a slot made in the supporting-base I. The chamber is properly formed by means of the adjustable or slotted plate H, bent at right angles upward, and a similar fixed piece, J, on the base-plate I. This base-plate I is bent down vertically, forming the portion N, and made adjustable at any desired height or inclination by means of the slots O O and binding-screws on and to the bed-plate A.

The combined operation may be briefly stated, including a description of the other portions shown at the same time, which is, to commence with, the point when the pin m has descended the inclined plane of the side cam, 6. The chamber-plate G, with the cork to be cut laid in, being slid forward by it, the cradle drops, bringing the spindles, with their graspers, on a line with the chamber, set or adjusted to the desirable size or form to be cut. At this point the throwing-cam 4 releases its pressure on the rod R, which is now acted upon by the weighted arm XV 7, and the spindle V, Fig. 6, with its toothed and revolving or socketed thimble XII, (capable of revolving with the cork,) is thrust forward to grasp the cork in the chamber, pressing it against the grasping-points on the end of the revolving spindle W, and is prevented from revolving in this position by means of a pin, 16, on the pulley IX of the spindle W, coming against a stop-plate, o o, on the end of the bed-plate. This pulley IX is operated by a strap from an inner pulley, XX, driven by a belt or gearing, so arranged that the driving cord or belt on pulley IX is slack when down, but becomes tightened as the cork is being elevated and presented to the knife, causing the cork to revolve under the action of the revolving knife. The cork being grasped, the cradle raised, the revolving spindle now turns the cork, where one revolution is cut away by the knife, however out of center at first, it is now truly circular, when the knife drops, more or less, according to the graduation set, and in the second revolution of the cork takes off a thin slice, and finishes the cork. The knife then rises, the sliding spindle is drawn back, and the cork is released, and would drop down into the chamber; but the tumbler K, held by the hangers XIV, Fig. 7, (pressed back as the grasped cork is being raised by the spindles, and again drops forward by the action of the weight 5,) swings forward and interposes, and the cork drops through an opening in the machinery behind the tumbler K and falls into a vessel placed for its reception. Each revolution of the cam-shaft VI operates all the cams simultaneously with their accessories, producing the automatic motions of the machinery in a manner to carry the wood to be grasped, raised, turned, and subjected to a cut and final finish by the knife, and thus repeats the operation with the greatest regularity and exactness, producing work highly satisfactory, if not superior to any other machine.

The speed and motion of the shaft are regulated in the gearing, put in motion by any desired motor power. The shaft D, Fig. 3, has a strap-pulley, IV. This revolves the circular cutter or knife F, say, seven hundred revolutions in a minute.

The advantages of this arrangement and invention are, first, the adjustable chamber, adapted for recutting to a uniform size hand-cut corks, damaged corks, defective on one side, by laying the damaged side up on the projecting portion of the plate G, forming the chamber with the adjusting-plate H. The cork is carried in that position forward without being shoved or rolled, and grasped by the spindles, (in such cases, below the center,) and presented to the action of the revolving knife, thus cutting off a thicker slice from the damaged or cracked side, and yet producing a uniform, good cork of a smaller size. Many corks, otherwise worthless, can be recut with ease and sold as other corks of like size.

The chamber is made adjustable in itself, and upon the bed-plate A can be accommodated for cutting corks cylindrical or of any degree of taper desirable, according as the chamber is inclined from the center lines of the thimble and spindle graspers. The spindle V, or sliding spindle, has its inner portion, i, bent upward at right angles, with its elevated portion slightly prolonged, with a socket in which the end of the thimble XII is fitted, and in which it is revolved by its grasp upon the cork put in revolution by the revolving spindle W, pulley, &c., as aforesaid. The necessity of arresting the revolution of the spindle while grasping a blank or angled piece of cork-wood lodged in the chamber is self-evident by means of the stop-plate o o, and slackening of the cord or belt by the motion of the cradle, which carries the spindles, bearings, and pulley as it rises and falls in the manner stated, produces the result of revolving the spindle and the cork while it is presented to the action of the knife when such revolution only is necessary. The elevated head U requires the spindle V and its bearings to be made lower than the bearings of the revolving spindle W. By means of this otherwise straight spindle and its upward projection I gain room also for the knife to clear the spindle when used for tapering small corks.

The combination and arrangement are novel and present various features not heretofore introduced, in the manner and for the purpose specified. I am aware, however, that circular knives as well as rotary cutter-heads having alternate blades and spaces are used in combination with automatic mandrels as well as half-wheel cam movements and accessories, differing, however, substantially in the manner of their application and operation. Such I disclaim. The series of cams on the same shaft harmonizing in their automatic action in successively raising the cradle and with it the spindles, releasing the cork, dropping down and grasping, raising, and dropping the knife, as well as operating the chamber, I deem an arrangement, whether separately or collectively considered, as presenting several marked novelties, and (as several machines in use prove) of the greatest utility.

What I claim as my invention, and desire to secure by Letters Patent, is—

1. A chamber, G H J, made adjustable in itself independently from the adjustability of the bed-plate A, operated substantially in the manner and for the purpose specified.

2. The construction and operation of the spindles or graspers V W and their appliances, arranged and, in combination with the cradle Y, operating jointly, substantially in the manner and for the purpose set forth.

3. The employment of a tumbler, K, or hanger or its equivalent, substantially applied in the manner or for the purpose shown and described.

4. The raising and dropping of the knife F, for the purpose of giving the finishing cut to the cork, actuated substantially in the manner specified.

HARRIS BOARDMAN.

Witnesses:
WM. B. WILEY,
JACOB STAUFFER.